US012030119B2

(12) United States Patent
Dreese et al.

(10) Patent No.: US 12,030,119 B2
(45) Date of Patent: Jul. 9, 2024

(54) IN-SITU POWDER WITNESS COUPON

(71) Applicants: Mackenzie Dreese, Houston, TX (US); Thomas Dobrowolski, The Woodlands, TX (US); Nicholas Barta, Houston, TX (US); Chad Yates, Houston, TX (US); Satya Rama Naga Lakshmi Ganti, The Woodlands, TX (US)

(72) Inventors: Mackenzie Dreese, Houston, TX (US); Thomas Dobrowolski, The Woodlands, TX (US); Nicholas Barta, Houston, TX (US); Chad Yates, Houston, TX (US); Satya Rama Naga Lakshmi Ganti, The Woodlands, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 412 days.

(21) Appl. No.: 17/219,050

(22) Filed: Mar. 31, 2021

(65) Prior Publication Data

US 2022/0314323 A1 Oct. 6, 2022

(51) Int. Cl.
*B22F 10/28* (2021.01)
*B22F 10/32* (2021.01)
(Continued)

(52) U.S. Cl.
CPC .............. *B22F 10/28* (2021.01); *B22F 10/32* (2021.01); *B22F 10/37* (2021.01); *B33Y 10/00* (2014.12); *B33Y 80/00* (2014.12)

(58) Field of Classification Search
CPC .......... B22F 10/28; B22F 10/32; B22F 10/37; B22F 5/003; B22F 10/38; B22F 10/39;
(Continued)

(56) References Cited

U.S. PATENT DOCUMENTS

| 10,596,626 B2 | 3/2020 | Demuth et al. |
| 2016/0214327 A1 | 7/2016 | Uckelmann et al. |

(Continued)

FOREIGN PATENT DOCUMENTS

| CN | 106424748 A | 2/2017 |
| CN | 107214950 B | 8/2018 |
| CN | 111469412 A | 7/2020 |

OTHER PUBLICATIONS

Spears et al., "In-process sensing in selective laser melting (SLM) additive manufacturing"; Integrating Materials and Manufacturing Innovation, Dec. 2016; 25 pages.
(Continued)

*Primary Examiner* — Anthony M Liang
*Assistant Examiner* — Danny N Kang
(74) *Attorney, Agent, or Firm* — CANTOR COLBURN LLP

(57) ABSTRACT

A process for producing a powder witness coupon including additively manufacturing a container simultaneously with a primary part, filling at least a portion of the container with a feed material employed for the part simultaneously with the additive manufacturing of the primary part, and sealing the container during the additive manufacturing of the primary part. An in-situ feed material powder witness coupon including a container additively manufactured simultaneously with a primary part, and a plurality of individual chambers within the container, at least one of the chambers being removable intact from the container. Further, a method for enhancing examination of feed material in an additively manufactured part including additively manufacturing a container simultaneously with a primary part, capturing feed material, density and environment in the container, and sealing the container.

20 Claims, 4 Drawing Sheets

(51) Int. Cl.
 *B22F 10/37* (2021.01)
 *B33Y 10/00* (2015.01)
 *B33Y 80/00* (2015.01)

(58) Field of Classification Search
 CPC ......... B22F 10/47; B33Y 10/00; B33Y 80/00;
  G01N 1/286; G01N 24/00
 See application file for complete search history.

(56) References Cited

U.S. PATENT DOCUMENTS

| | | |
|---|---|---|
| 2016/0361873 A1 | 12/2016 | Maier |
| 2017/0157809 A1 | 6/2017 | Deka et al. |
| 2017/0232557 A1 | 8/2017 | Demuth et al. |
| 2019/0126346 A1 | 5/2019 | Graichen et al. |
| 2019/0143413 A1 | 5/2019 | Dave et al. |
| 2019/0009338 A1 | 9/2019 | McMurty et al. |

OTHER PUBLICATIONS

International Search Report and Written Opinion; PCT/US2022/071383; Korean Intellectual Property Office; dated Jul. 15, 2022; 9 pages.

IN-SITU POWDER WITNESS COUPON

BACKGROUND

Additive manufacturing has become important to industry and continues to grow in its application. Attendant that growth is an ever-increasing need for quality control, repeatability and data regarding process and feed material quality. While there are a number of traditional methods to test materials in some way, such as manually collecting feed material unused on the build plate after the build process is concluded, there are no efficient testing and sampling methodologies that provide more than minimal or misleading information about the feed material or the build process. The art would well receive advances in this regard.

SUMMARY

An embodiment of a process for producing a powder witness coupon including additively manufacturing a container simultaneously with a primary part, filling at least a portion of the container with a feed material employed for the part simultaneously with the additive manufacturing of the primary part, and sealing the container during the additive manufacturing of the primary part.

An embodiment of an in-situ feed material powder witness coupon including a container additively manufactured simultaneously with a primary part, and a plurality of individual chambers within the container, at least one of the chambers being removable intact from the container.

A method for enhancing examination of feed material in an additively manufactured part including additively manufacturing a container simultaneously with a primary part, capturing feed material, density and environment in the container, and sealing the container.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
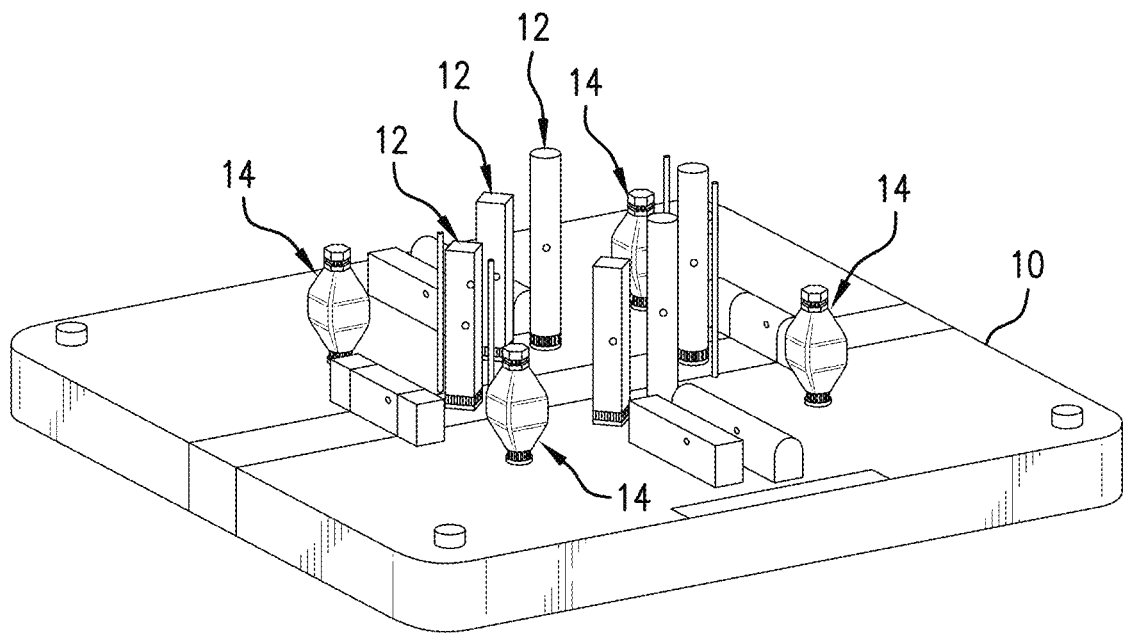
FIG. 1 is a perspective view of an additive manufacture build plate with several primary parts thereon and several powder witness coupons as disclosed herein thereon.

Referring to FIG. 1, a perspective view of an additive manufacture build plate 10 is generically illustrated with several primary parts 12 thereon and several powder witness coupons 14 as disclosed herein thereon. The build plate may be considered as one in any number of different additive manufacturing devices. It is to be appreciated that one advance of the disclosure hereof is that the powder witness coupons 14 are additively manufactured simultaneously with the primary parts 12 rather than created post build process as would be the case in the prior art by manually filling a jar with unused feed material from the powder bed using a scooper and then securing the jar. The simultaneously additively manufactured powder witness coupon facilitates collection of feed material in the same condition and density as that used to melt the primary parts 12 as well as collection and maintenance of the environment within the additive manufacturing operation for the time over which the powder witness container is being grown. This is because the powder witness coupon 14 is actually created simultaneously with the primary part 12 and feed material is deposited in the powder witness coupon 14 simultaneously as well. Powder witness coupons 14 thereby contain feed material, environment (atmosphere), potential contamination, and pack density exactly as those parameters are in existence in the primary part 12. Powder witness coupons 14 furthermore contain and preserve process fumes/condensate/soot material that is created during the melting process. Based on the position of the powder witness coupon 14 process fumes/condensate/soot are reliably captured for consistent analysis. As to environment, commonly the atmosphere in the additive manufacturing device will be Argon or another inert gas or gasses but the percentage of inert gas or gasses may vary in different builds and problems with the operation might make the environment different than expected. Powder witness coupons 14 as disclosed herein preserve that atmosphere whereas prior art method that occur post build clearly cannot. Further, because the powder witness coupon 14 is also sealed simultaneously as the primary part or parts 12 are being made, another environmental factor, the pressure in the system, at that time is also preserved. Each of these environmental conditions may be verified utilizing the powder witness coupon and method disclosed herein.

The powder witness coupon 14 disclosed herein should be understood to be employable with any kind of feed material. In one instance, the feed material is a powder feed material used in a powder bed build process. In such a process the powder witness coupon 14 captures in real time an unsintered, unmelted sample of powder, as well as printed material. The powder is laid upon the build plate 10 evenly and the witness container 14 is created with a Selective Laser Melting (SLM) also known as Direct Metal Laser Melting (DMLM) processing. The powder that exists inside of the layer of melted material that forms a layer of the powder witness coupon 14 is unchanged from its deposition on the build plate 10.

Powder witness coupons 14 created in the way disclosed provide more data about the feed material, the build process and conditions experienced in the build process than any art recognized powder witness coupon process. Further, the conditions captured are preserved indefinitely within the unadulterated powder witness coupon 14.

In addition to the foregoing benefits of the disclosed powder witness coupon 14, it is further disclosed that the powder witness coupon 14 is configured with a plurality of chambers 16, 18 and 20 therein that are each formed and hermetically sealed during the same build process. At least one of the chambers 16 is also separable from the rest of the powder witness coupon 14 intact. Chamber 16 is formed in one embodiment, with a wall thickness of about 0.15 mm to about 1 mm in order to facilitate high resolution (e.g. nanoscale resolution) Computed Tomography analysis of the feed material within the chamber 16 without opening the same and without significant losses in data clarity. Computed Tomography of the feed material in the as deposited condition and in the as deposited environment allows determination of pack density (by for example weight to volume ratio, gas pycnometry or the Archimedes principle), morphology, internal porosity, particle size distribution (PSD), contamination and at least an idea of internal microstructure a degree not heretofore possible. A benefit of a thin (and in embodiments round) wall is enhanced CT resolution and contrast that it is relatively easy to distinguish the regular wall dimensions from the deposited feed material that is not a part of the wall. Additional chambers 18 and 20 may be used for Particle Size Distribution (PSD) analysis and Inductively coupled Plasma (ICP) analysis, respectively. Other art known methods for chemical composition analysis are also contemplated. These can be done at a desired time by opening the relevant chambers.

Figure 2:
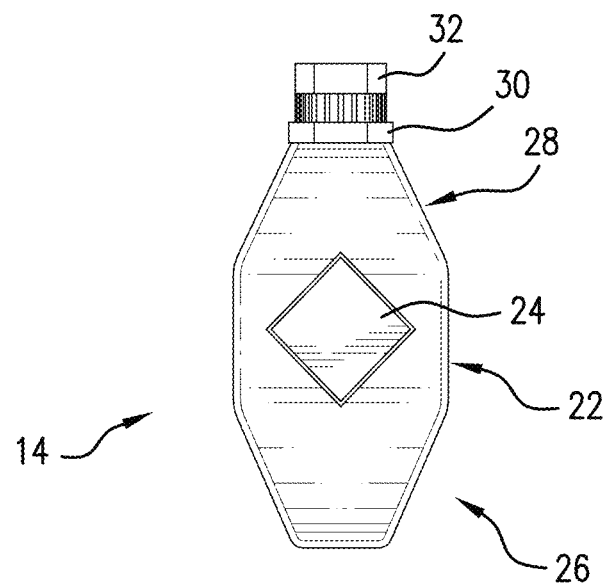
FIG. 2 is a perspective view of a powder witness coupon as disclosed herein.
Figure 3:
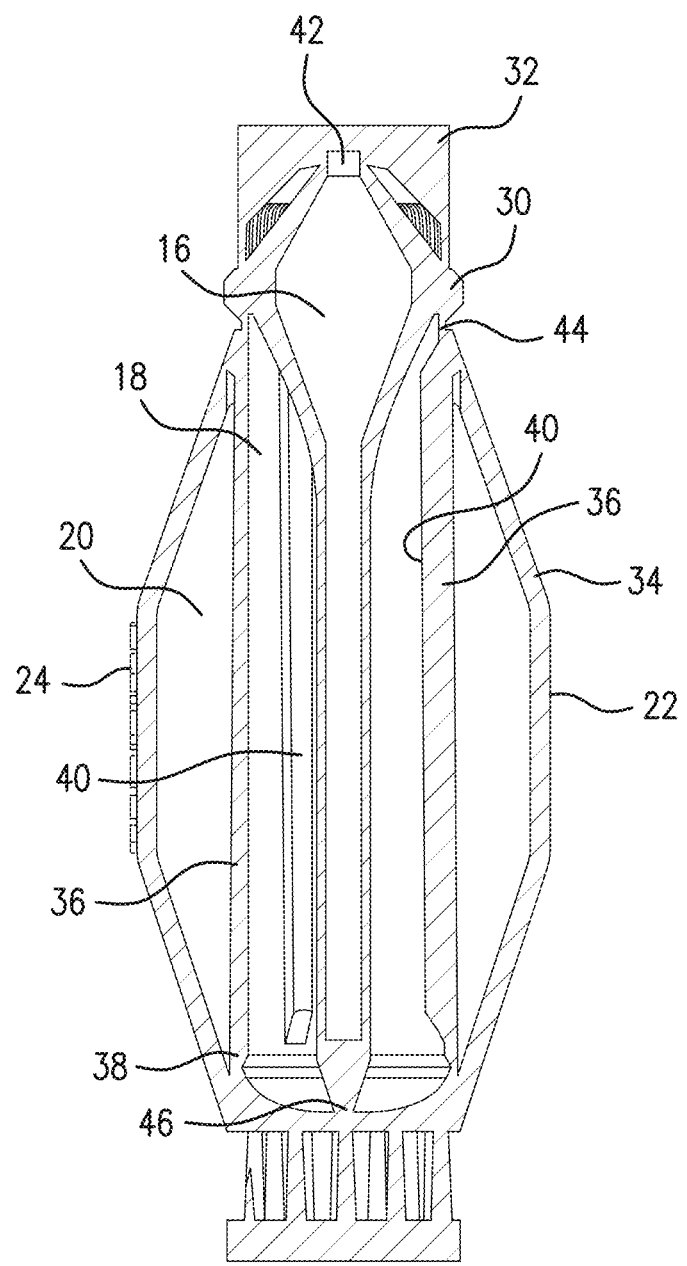
FIG. 3 is a cross sectional view of the powder witness coupon illustrated in FIG. 2.

Referring to FIG. 2-3, one embodiment of a three chambered powder witness coupon 14 is illustrated in an elevation view, and a cross sectional view. Focusing on FIG. 2 first, some important features of the powder witness coupon 14 are visible. Particularly, the coupon 14 exhibits a shape that includes flats 22. At least two flats 22 will be provided so that torque may be easily applied to the powder witness coupon 14 for opening purposes when desired. As illustrated, one will appreciate that a lateral cross section view through the flats 22 would be square. It is also contemplated that the cross section could be hexagonal with the same ultimate purpose of the shape being the presentation of usable wrench flats. Also noticeable is an indicator 24 additively manufactured right into the powder witness coupon 14. The indicator is for one or more of build date, materials, hazards, etc. adjacent the flats 22 are frustoconical sections 26 and 28. These sections may be created in different shapes but it is noted the frustoconical shape is advantageous since no support structure is required while additively manufacturing the same. At an end of the powder witness coupon 14 are additional features provided for opening purposes. These are cap 30 and cap 32. In each case the illustration is of a hexagonal shape but note that other shapes are contemplated. Any shape may be used as it is also contemplated herein to produce a tool having an engaging shape for each to be used when opening is desired. Cap 32 is associated with the opening of chamber 16 while cap 30 is associated with the opening of chamber 18 as well as the removal of chamber 16 intact from the rest of the powder witness coupon 14.

Moving to FIG. 3, a cross sectional view of the powder witness coupon 14 will improve understanding of the plurality of chambers 16, 18, 20 created and accessible at will. Starting with the outer housing that is illustrated in FIG. 2, flats 22 will orient the view for the reader. Chamber 20 is defined by an outer wall 34 that forms the flats 22 and by an intermediate wall 36 defining a volume therebetween that will hold feed material. The intermediate wall 36 may be, in some embodiments, connected to outer wall 34 by a weakened joint 38 so that separation of the intermediate wall 36 from the outer wall 34 may be effected relatively easily upon the application of torque to the joint 38. Torque may be applied to the outer wall 34 through flats 22 and torque may be applied to the intermediate wall 36 through ribs 40 or similar features of the intermediate wall 36. Such separation is accomplished after removal of the intact chamber 16 such that open access to an inside of intermediate wall 36 is possible.

Figure 4:
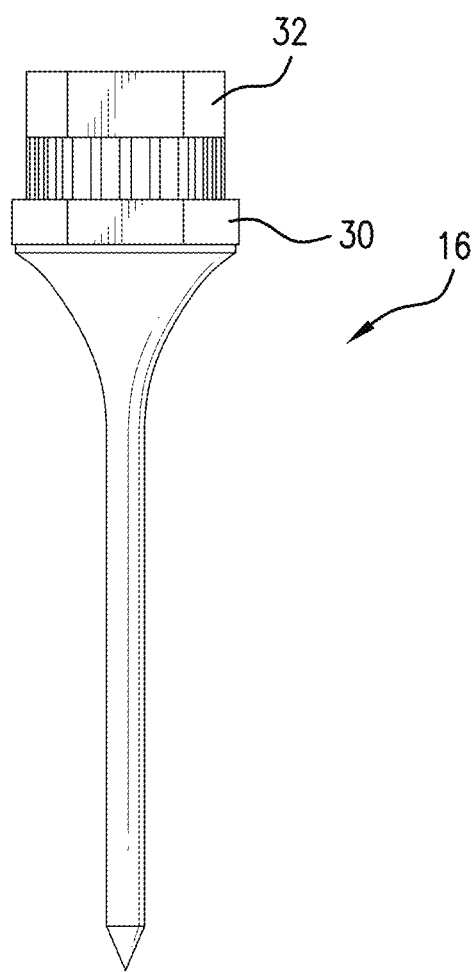
FIG. 4 is a perspective view of an intact removable chamber of the powder witness coupon illustrated in FIGS. 2 and 3.
Figure 5:
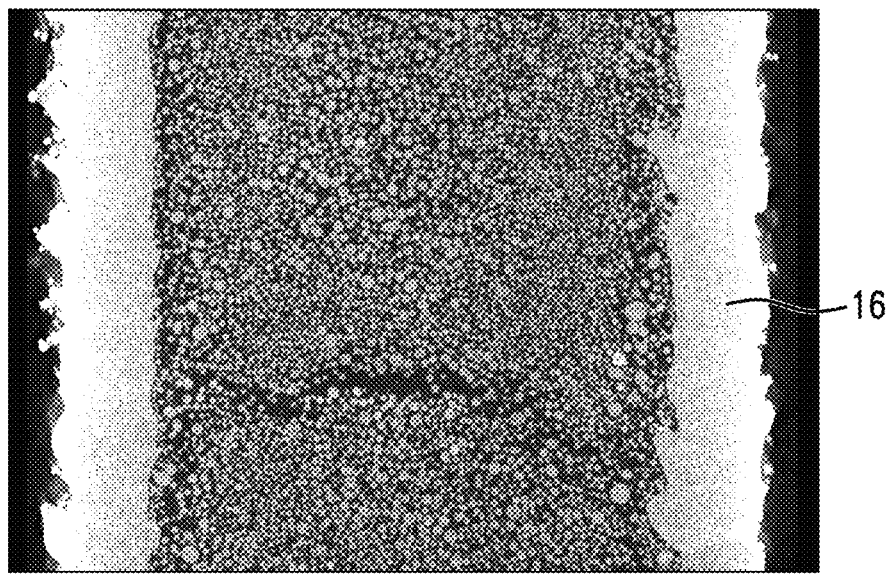
FIG. 5 is a CT scan of the intact chamber 16.

Focusing upon chamber 16, the chamber may be removed intact as stated, meaning in a sealed condition or may be opened while still a part of the powder witness coupon 14. If it is desired to open the chamber 16 while the powder witness coupon 14 is still assembled, the cap 30 is held and the cap 32 is subjected to torque such that torque is applied between cap 30 and cap 32. Cap 32 will part from the coupon 14 and reveal an opening 42 in chamber 16. If on the other hand, chamber 16 is to be removed intact, torque is applied between cap 30 and flats 22. In this event, chamber 16 will be separated from wall 34 at joint 44 and joint 46 at which point the entire intact chamber 16 along with its still attached cap 32 may be removed from the powder witness coupon 14 for processing on its own. Reference is made to FIG. 4 where the intact chamber 16 is illustrated. Processing may be CT scanning of the intact chamber 16 (see FIG. 5) or may also involve opening of the chamber 16 by removal of cap 32 for further analysis of internal content.

The powder witness coupon described herein can help with quality assurance for all builds by facilitating development of a standard for powder (or other feed material) as observed during the print process. Print quality may therefore be monitored throughout the build process of the part (from powder to part to post-build processes, for example). This level of quality assurance (capturing in process parameters) is of great benefit to the art in improving quality and efficiency.

Set forth below are some embodiments of the foregoing disclosure:

Embodiment 1: A process for producing a powder witness coupon including additively manufacturing a container simultaneously with a primary part, filling at least a portion of the container with a feed material employed for the part simultaneously with the additive manufacturing of the primary part, and sealing the container during the additive manufacturing of the primary part.

Embodiment 2: The process as in any prior embodiment, wherein the filling includes capturing an atmosphere at the additive manufacturing of the primary part.

Embodiment 3: The process as in any prior embodiment further comprising additively manufacturing more than one chamber within the container.

Embodiment 4: The process as in any prior embodiment, wherein the filling is at least a portion of more than one of the more than one chambers.

Embodiment 5: The process as in any prior embodiment, wherein the sealing of the container includes individually sealing more than one of the one or more chambers.

Embodiment 6: An in-situ feed material powder witness coupon including a container additively manufactured simultaneously with a primary part, and a plurality of individual chambers within the container, at least one of the chambers being removable intact from the container.

Embodiment 7: The powder witness coupon as in any prior embodiment, wherein the removable intact chamber is bounded by a wall thickness ranging from 0.15 mm to 1 mm.

Embodiment 8: The powder witness coupon as in any prior embodiment, wherein the removable intact chamber defines internal dimensions receptive of a sufficient feed material to examine particle density.

Embodiment 9: The powder witness coupon as in any prior embodiment, wherein the particle density is bulk density or individual particle density.

Embodiment 10: The powder witness coupon as in any prior embodiment, wherein each of the individual chambers is hermetically sealed during additive manufacture thereof.

Embodiment 11: The powder witness coupon as in any prior embodiment, wherein one or more of the plurality of chambers includes a weakened portion to facilitate separation of the chamber from the container.

Embodiment 12: The powder witness coupon as in any prior embodiment, Wherein an outside surface of the container includes flats.

Embodiment 13: The powder witness coupon as in any prior embodiment, wherein each chamber includes flats.

Embodiment 14: The powder witness coupon as in any prior embodiment, wherein an outside surface of the container includes an identifier disposed on the container during additive manufacture.

Embodiment 15: A method for enhancing examination of feed material in an additively manufactured part including additively manufacturing a container simultaneously with a primary part, capturing feed material, density and environment in the container, and sealing the container.

Embodiment 16: The method as in any prior embodiment, further comprising running one or more examination tests on the container.

Embodiment 17: The method as in any prior embodiment, wherein the container includes a plurality of chambers that are individually sealed, the method comprising removing one of the chambers from the container in a sealed condition (intact) and running examination tests thereon.

Embodiment 18: The method as in any prior embodiment, wherein the testing includes Computed Tomography of the feed material while the material remains contained within the removed intact chamber.

Embodiment 19: The method as in any prior embodiment, further comprising opening one or more chambers of the container and analyzing the contents thereof using one or more of inductively coupled plasma analysis (ICP), particle size distribution testing (PSD), Computed Tomography, and Morphology testing.

Embodiment 20: The method as in any prior embodiment, wherein the opening includes engaging a tool having a profile opposite that of the chamber to be opened and applying torque to the chamber with the tool.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A process for producing a powder witness coupon comprising:
    additively manufacturing a container simultaneously with a primary part wherein the primary part is not within the container;
    filling at least a portion of the container with a feed material employed for the part simultaneously with the additive manufacturing of the primary part; and
    sealing the container during the additive manufacturing of the primary part.

2. The process as claimed in claim 1 wherein the filling includes capturing an atmosphere at the additive manufacturing of the primary part.

3. The process as claimed in claim 1 further comprising additively manufacturing more than one chamber within the container.

4. The process as claimed in claim 3 wherein the filling is at least a portion of more than one of the more than one chambers.

5. The process as claimed in claim 3 wherein the sealing of the container includes individually sealing more than one of the one or more chambers.

6. An in-situ feed material powder witness coupon comprising:
    a container additively manufactured simultaneously with a primary part wherein the primary part is not within the container; and
    a plurality of individual chambers within the container, at least one of the chambers being removable intact from the container.

7. The powder witness coupon as claimed in claim 6 wherein the removable intact chamber is bounded by a wall thickness ranging from 0.15 mm to 1 mm.

8. The powder witness coupon as claimed in claim 6 wherein the removable intact chamber defines internal dimensions receptive of a sufficient feed material to examine particle density.

9. The powder witness coupon as claimed in claim 8 wherein the particle density is bulk density or individual particle density.

10. The powder witness coupon as claimed in claim 6 wherein each of the individual chambers is hermetically sealed during additive manufacture thereof.

11. The powder witness coupon as claimed in claim 6 wherein one or more of the plurality of chambers includes a weakened portion to facilitate separation of the chamber from the container.

12. The powder witness coupon as claimed in claim 6 wherein an outside surface of the container includes flats.

13. The powder witness coupon as claimed in claim 6 wherein each chamber includes flats.

14. The powder witness coupon as claimed in claim 6 wherein an outside surface of the container includes an identifier disposed on the container during additive manufacture.

15. A method for enhancing examination of feed material in an additively manufactured part comprising:
    additively manufacturing a container simultaneously with a primary part wherein the primary part is not within the container;
    capturing feed material, density and environment in the container; and
    sealing the container.

16. The method as claimed in claim 15 further comprising running one or more examination tests on the container.

17. The method as claimed in claim 15 wherein the container includes a plurality of chambers that are individually sealed, the method comprising removing one of the chambers from the container in a sealed condition (intact) and running examination tests thereon.

18. The method as claimed in claim 17 wherein the testing includes Computed Tomography of the feed material while the material remains contained within the removed intact chamber.

19. The method as claimed in claim 15 further comprising opening one or more chambers of the container and analyzing the contents thereof using one or more of inductively coupled plasma analysis (ICP), particle size distribution testing (PSD), Computed Tomography, and Morphology testing.

20. The method as claimed in claim 19 wherein the opening includes engaging a tool having a profile opposite that of the chamber to be opened and applying torque to the chamber with the tool.

\* \* \* \* \*